UNITED STATES PATENT OFFICE.

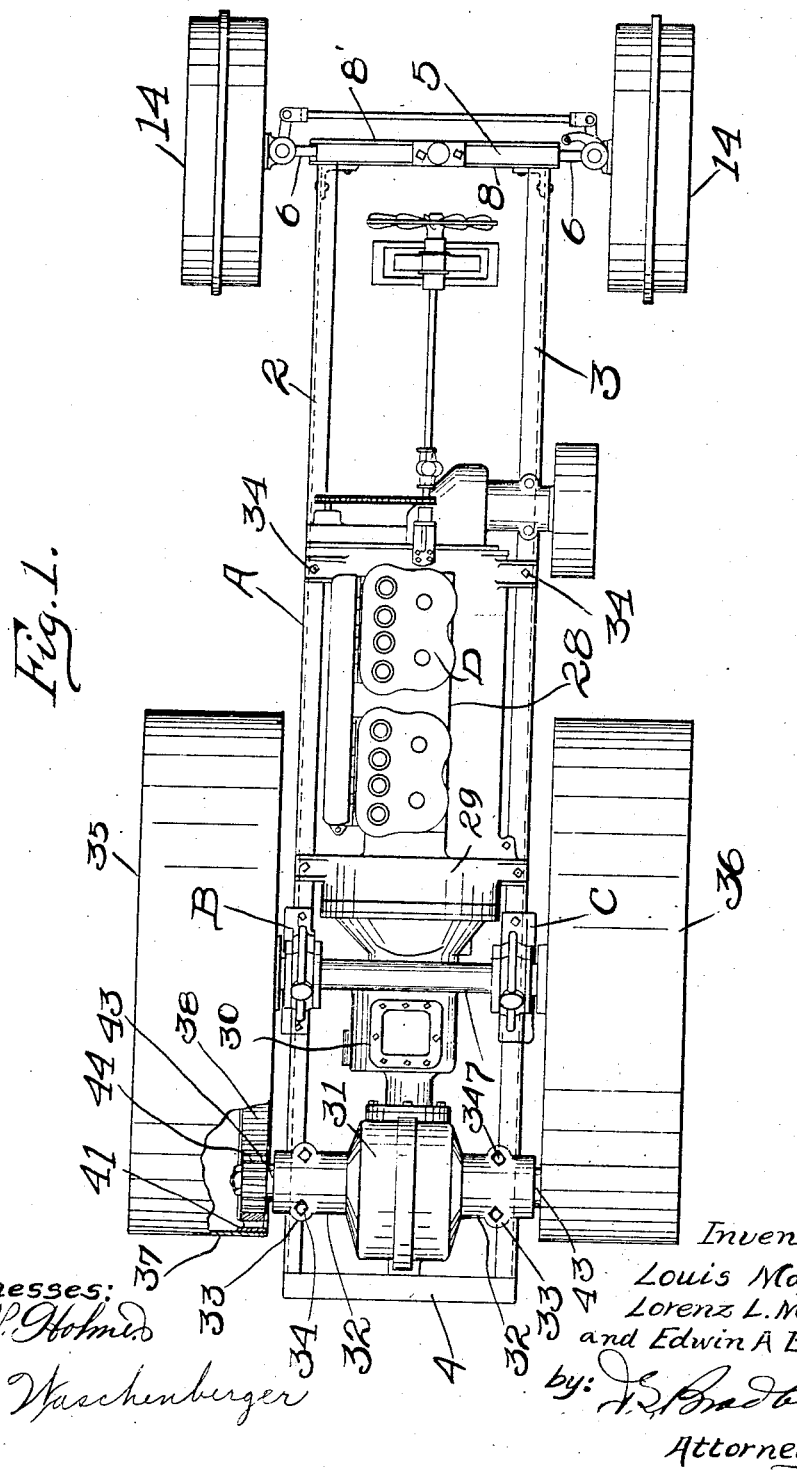

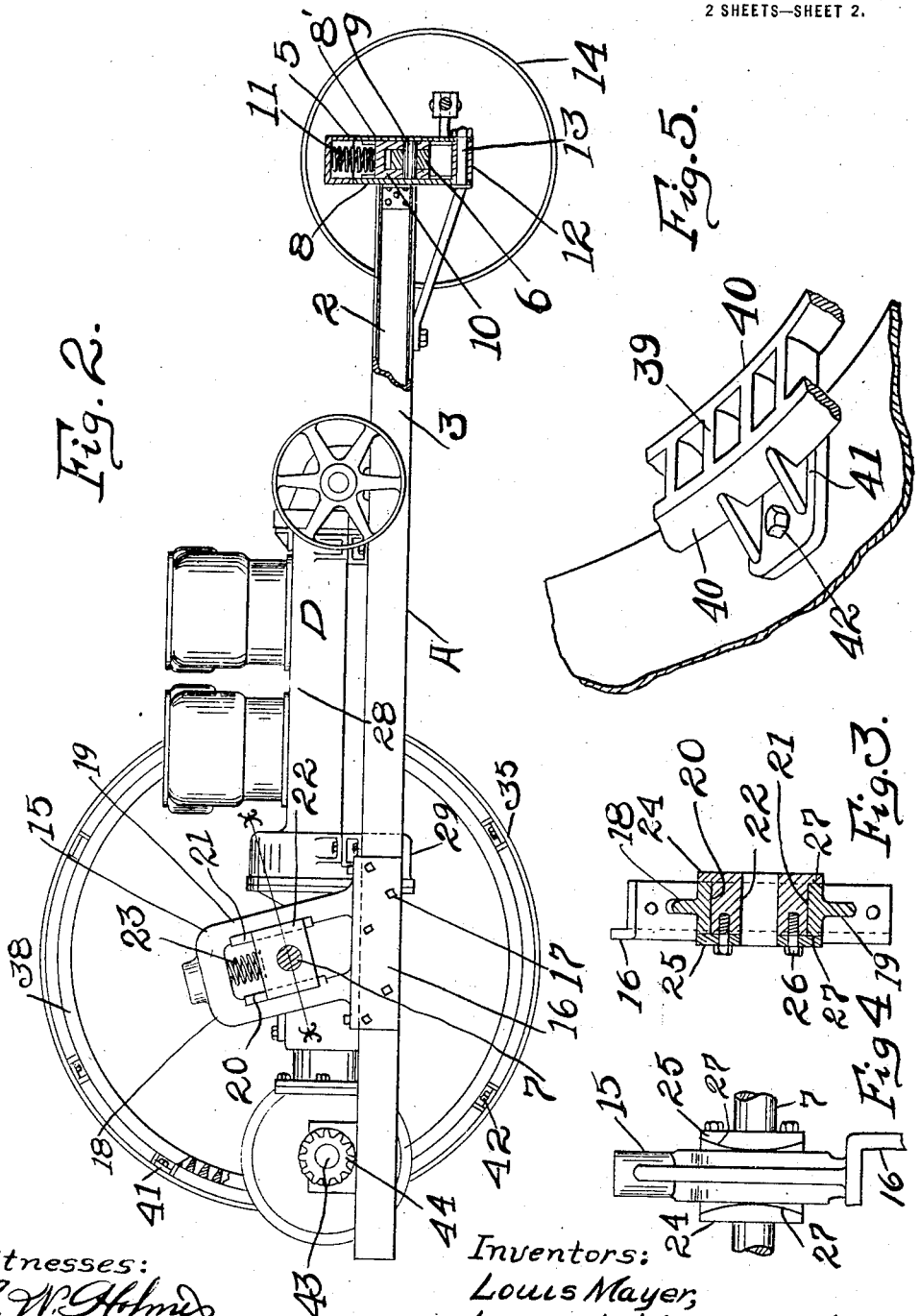

LOUIS MAYER, LORENZ L. MAYER, AND EDWIN A. BYE, OF MANKATO, MINNESOTA, ASSIGNORS TO MAYER BROTHERS COMPANY, OF MANKATO, MINNESOTA, A CORPORATION OF MINNESOTA.

TRACTOR.

1,288,952.     Specification of Letters Patent.     Patented Dec. 24, 1918.

Application filed December 12, 1913, Serial No. 806,232. Renewed October 23, 1916. Serial No. 127,308.

*To all whom it may concern:*

Be it known that we, LOUIS MAYER, LORENZ L. MAYER, and EDWIN A. BYE, citizens of the United States, residing at Mankato, in the county of Blue Earth and State of Minnesota, have invented new and useful Improvements in Tractors, of which the following is a specification.

The primary object of this invention is the production of a tractor in which the driving mechanism is so incorporated into the frame construction and applied to revolve the drive wheels as to produce the most advantageous results. A further object is to combine with the mode of applying the power to the drive wheels a simple and effective method for hanging the frame and the parts which it carries on the rear axle. These features as combined in our invention produce a tractor which is adapted to carry its load close to the ground rendering the tractor exceedingly stable and also applying the power to the drive wheels close to the point of work in a direct manner with little loss of power.

In the accompanying drawings forming part of this specification, Figure 1 is a plan of our invention, part of one of the drive wheels being broken away and in section to expose the mode of applying the power to the drive wheels; Fig. 2 is a side elevation partly in section and broken away of our invention, one of the drive wheels and one of the steering wheels being removed; Fig. 3 is a section on the line X—X of Fig. 2; Fig. 4 is a side view looking at one end of a detail of one of the suspension bearing yokes for the rear axle showing the rear axle bearing block therein, and Fig. 5 is a perspective of a detail of the internal gear carried by each of the drive wheels.

In the drawings A indicates the main frame of the chassis having two side bars 2 and 3, a rear end bar 4, and a front axle mount 5, all secured together to form a strong and rigid structure. This frame is mounted upon the front and rear axles 6 and 7, the method of mounting being by an underslung construction, so that the frame hangs below the rear axle near the ground, but high enough to provide sufficient clearance for practical use. The front axle mount is in the form of a channel member having sides 8 and 8' extending transversely of the frame and in which the axle 6 is free to move vertically and the frame to rock freely from a pivot support produced by a pin 9 passing through the axle and a holder 10, the latter being guided vertically in the middle portion between the side walls of the channel member. A spring 11 is interposed between the upper end of the channel member and the top of the holder, thus providing a resilient support for the frame on the holder and axle. The lower portion of the channel member has a stop below the holder to prevent the channel member rising vertically above the holder, said stop consisting of a sleeve 12 interposed lengthwise between the walls of the channel member through which a bolt 13 passes and secures the sleeve and lower portions of the walls together. The steering wheels 14 are mounted upon the ends of the axle in the usual manner.

The rear axle 7 has the frame mounted thereon by a pair of suspension bearings B and C, one of said bearings being secured to each of the side bars 2 and 3, and oppositely disposed. The suspension bearings being similar in construction, a description of one will suffice. A yoke member 15 has its lower portion secured to the side bar on which it is mounted by means of an angle plate 16 and bolts 17, and the sides of the yoke member 18 and 19 are disposed parallel and incline upwardly and rearwardly, their inner faces 20 and 21 forming guides between which a bearing block 22 is adapted to slide up and down. The axle 7 is journaled in or supported by the bearing block and a spring 23 is interposed between the upper end of the yoke and the top of the bearing block, thus resiliently supporting the load carried by the yoke on the bearing block and axle. The bearing block is provided with ends 24 and 25 (see Fig. 3) which overlap the side edges of the yokes to hold the bearing block laterally upon the yoke. The end 25 is formed by a plate which is detachably secured to the body of the bearing block by bolts 26. The inner surfaces 27 of the end portions 24 and 25 are convex so that a free tilting motion may be accorded the rear axle and the frame.

The power mechanism not shown, of usual construction and having a prime mover of any kind that illustrated being a gas engine D is carried by a rigid casing formed by an engine housing part 28, a clutch housing 29, a transmission housing 30, a differential housing 31 and a power shaft housing 32, said parts being rigidly secured together to form a unitary structure. This structure is mounted by suitable flange supports such as 33 upon the frame, said supports being secured to the frame by bolts 34. In this manner the casing is adapted to combine with the frame in producing a unitary self sustaining structure, said parts coöperating together to reinforce the strength of each other and providing a single structure which is mounted upon the axles.

The rear axle 7 is bowed upwardly between its ends to span the transmission housing 30 freely and carries upon its ends in the usual manner a pair of drive wheels 35 and 36 having broad faced rims 37. To the inner face of each of these rims is fastened an internal gear 38 having teeth 39 spaced apart and held together at their ends by rims 40. These rims are carried by stirrups 41 which are fastened to the rim of the wheel as by bolts or rivets 42, a sufficient number of stirrups being provided to support the gear and hold it distanced from the inner surface of the rim, so that any material which may be caught between the teeth of the gear is free to pass outwardly from between them. The drive shaft parts 43 which are journaled in the shaft casing 32 and receive power in the usual manner through any suitable differential and transmission mechanism not shown carry upon their outer ends which project from the sides of the frame suitable pinions 44, the teeth of which are adapted to mesh with the teeth of the internal gears on the drive wheels. This mode of applying the power to the wheels is direct and simple. The structure pertaining to the driving mechanism is shown and described in applicants' co-pending application Ser. No. 806,439.

The rearward and upward inclination of the sides 18 and 19 of the yoke of each suspension bearing B and C is such as to guide the pinions 44 into free engagement with the teeth of the gears and compensate for the up and down motion between the axle and the frame, the length of up and down movement between the rear axle and frame never being greater than is compensated by this angle of inclination in the practical use of the machine.

In accordance with the patent statutes, we have described the principles of operation of our invention together with the apparatus which we now consider to represent the best embodiment thereof but we desire to have it understood that the construction shown is only illustrative and that the invention can be carried out by other means and applied to uses other than those above set forth within the scope of the following claims.

Having described our invention, what we claim as new and desire to protect by Letters Patent is:—

1. In a tractor, front and rear axles, a frame mounted upon said front axle and underslung from said rear axle, the underslung connection consisting of a pair of yoke members disposed one on each opposite side of said frame, the sides of each yoke forming guide members inclined upwardly and rearwardly, a bearing block on said rear axle slidable up and down in each of said yokes between said guides, and a spring interposed between the upper end of each yoke and the top of said journal block supporting the load carried by said yoke on said block, a casing mounted rigidly upon said frame and coöperating therewith to form a unitary self sustaining structure, said casing and frame being strengthened and buttressed by each other, drive shaft members journaled in and projecting from said casing on opposite sides of said frame to the rear of said axle, and internal gears in said drive wheels with the teeth of which the teeth of said pinions are adapted to mesh, the angle of inclination of the guides in said yokes compensating the change in position of said pinions on said gears to prevent said teeth binding when said frame moves up and down upon the rear axle.

2. In a tractor, front and rear axles, a frame mounted upon said axles, drive wheels upon said rear axle, internal gears mounted in and secured to the rim of each of said wheels, a casing mounted rigidly upon said frame and coöperating therewith to form a unitary self sustaining structure, said casing and frame being strengthened and buttressed by each other, drive shaft members journaled in said casing and projecting from the sides of said frame and carrying pinions upon their outer ends having teeth meshing with the teeth of said gears to engage and revolve said wheels, each of said gears consisting of a pair of side ring members with the bodies of said teeth between and spaced apart to form outward passages between the roots of the teeth and stirrup elements carrying said ring members spaced from and secured to the rim of the wheel.

In testimony whereof, we have signed our names to this specification in the presence of two subscribing witnesses.

LOUIS MAYER.
LORENZ L. MAYER.
EDWIN A. BYE.

Witnesses:
H. F. LEONARD,
JOSEPH S. MARKA.